United States Patent [19]

Taylor

[11] 4,082,340
[45] Apr. 4, 1978

[54] AIR CURRENT DEFLECTING DEVICE

[76] Inventor: Alexander Taylor, 855 Chapleau Dr., Pickering, Canada, L1W 1P5

[21] Appl. No.: 711,247

[22] Filed: Aug. 3, 1976

[51] Int. Cl.² .......................................... B62D 35/00
[52] U.S. Cl. ........................................ 296/1 S; 98/2; 105/2 R
[58] Field of Search ................... 98/2; 105/2 A, 2 B, 105/2 R; 296/1 S, 91

[56] References Cited

U.S. PATENT DOCUMENTS

| | | | |
|---|---|---|---|
| 3,596,974 | 8/1971 | Adams | 296/91 |
| 3,768,854 | 10/1973 | Johnson | 296/1 S |
| 3,794,372 | 2/1974 | Webb | 296/1 S |
| 3,834,752 | 9/1974 | Cook | 105/2 R |
| 3,894,764 | 7/1975 | Powell | 296/1 S |
| 3,904,236 | 9/1975 | Johnson | 296/91 |
| 3,999,796 | 12/1976 | Greene | 296/1 S |

*Primary Examiner*—Philip Goodman
*Assistant Examiner*—John A. Carroll
*Attorney, Agent, or Firm*—Robert D. Farkas

[57] ABSTRACT

This disclosure pertains to an air deflector mounted on the roof of a towing vehicle to deflect upwardly a stream of air impinging on an inclined surface of the deflector thereby decreasing the drag of the towed vehicle. A pair of accordian side sheets prevent cross currents of air from acting on the lowermost surface of the inclined sheet and minimizes the vacuum pocket otherwise formed. Members for mounting the inclined surface to the roof of the vehicle and members to adjust the angle of inclination thereto are disclosed.

7 Claims, 2 Drawing Figures

AIR CURRENT DEFLECTING DEVICE

BACKGROUND OF THE INVENTION

1. THE FIELD OF THE INVENTION

This invention relates to air deflecting devices and more particularly to that class of portable apparatus adapted to be mounted to the roof of a towing vehicle.

2. DESCRIPTION OF THE PRIOR ART

The prior art abounds with towing vehicle borne air deflectors utilized to diminish the drag effect incurred by towed vehicles. U.S. Pat. No. 3,794,372 issued on Feb. 26, 1974 to W. Webb teaches an air deflector mounted on the roof of a towing vehicle to deflect air upwardly and sideways relative to a trailer, thereby decreasing the drag of the trailer. The air deflector inclines rearwardly and upwardly from a front edge which rests sealingly on the roof of the towing vehicle as close as possible to the top of the windshield, the deflector widening rearwardly and having depending side surfaces, with means extending between the roof and the deflector for varying the inclination of the deflector.

U.S. Pat. No. 3,596,974 issued on Aug. 3, 1971 to J. Q. Adams discloses an air current deflecting device for use with a vehicle pulling a trailer or the like. An elongated transparent deflecting shield is pivotably secured to a pair of spaced apart support members which are detachably secured to the vehicle so as to position the deflecting shield above the roof of the vehicle. The shield includes a face portion having a length approximately equal to the width of the vehicle roof and having wing portions at opposite ends thereof which extend downwardly and rearwardly therefrom. The shield is selectively movable from a position wherein the leading edge of the face portion is positioned below and forwardly of the trailing edge of the face portion so that the inclined face portion will deflect air currents passing over the vehicle roof upwardly and rearwardly above the forward end of the trailer. The lower or leading edge of the shield is positioned above the vehicle roof to permit a certain amount of air to pass therebelow to eliminate the formation of a vacuum pocket rearwardly of the shield means. The shield may also be selectively pivoted to an inoperative position wherein the face portion of the shield is substantially parallel to the roof of the vehicle.

Both of the aforementioned inventions suffer the common deficiency of providing fixed dimensioned side air deflectors affixed to the side edges of the inclined deflecting surface. Such apparatus is susceptible to gusts of air directed to the side of the towing vehicle causing the air deflecting characteristics of such apparatus to be ineffective and, in some instances, causing an upwardly directed force to be exerted upon the lowermost surface of the inclined deflecting surface.

SUMMARY OF THE INVENTION

A primary object of the present invention is to provide an inclined air deflecting surface which presents side walls to cross currents of moving air regardless of the angle of inclination of the apparatus relative to the plane of the roof of the towing vehicle to which it is affixed.

Another object is to provide an air deflecting surface whose angle of inclination may be varied relative to the plane of the roof of the towing vehicle to which it is attached.

Still another object is to provide an air deflecting surface which permits a portion of the wind gusts directed at the side of the towing vehicle to pass under the deflecting apparatus thereby minimizing the forces induced on the deflecting apparatus by such cross currents of air.

Yet another object is to provide an air deflecting apparatus which deflects streams of air impinging upon the towing vehicle from angles directed towards the rear of the towing vehicle as well as from angles directed towards the side of the towing vehicle.

Heretofore, air deflecting apparatus adapted to be removably mounted on the uppermost surface of a towing vehicle was principally concerned with the stream of air passing in the direction from the front of the towing vehicle towards its rear. The present invention not only causes such a stream of air to be deflected upwardly and rearwardly of the towing vehicle so as to avoid a drag effect created by the contact of undeflected air impinging upon the leading vertical-like surfaces of the towed vehicle, but also deflects such streams of air which are contacting the side edges of a deflecting plate used therefor, permitting sidewardly air gusts to be forced to be redirected over the top of the deflecting plate and thence over the leading vertical edges of the towed vehicle. Cross streams of air are encountered when the vehicle is moving at relatively slow speeds and subject to natural wind gusts and whilst the towing vehicle is turning at relatively high speeds. The deflecting plate is adjustable in the angle of inclination formed with the uppermost surface of the towing vehicle and is removably affixed thereto. The cross current of air problem is dealt with by utilizing a pair of accordianlike pleated side elements attached to the side edges of the deflecting plate, accommodating an angular relationship to the angle of inclination of the deflecting plate.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to an air deflecting surface, acting as an air plow, to which a base plate is pivotably affixed. The base plate utilizes a barrel hinge to join to the air deflecting surface at a point adjacent a marginal edge thereof. A plurality of rubber-like suction cups extend downwardly from the base plate and are adapted to engage the roof of a towing vehicle, such as an automobile. A plurality of rain gutter clamps are secured to the side marginal edges of the base plate and are utilized to clampingly compress the suction cups, securing the base plate in removable engagement with the roof of the towing vehicle.

The air deflecting surface, by virtue of the hinge element pivotably securing it to the base plate, may be positioned at various angles of inclination relative to the roof of the vehicle such that the hinge is located forward of the remaining portions of the base plate. The overhanging portion of the air deflecting surface pivots downwardly and may, at a maximum inclination angle of the deflecting surface, contact the roof of the towing vehicle. At all lesser angles of inclination, the leading edge of the air deflecting surface is displaced upwardly from the roof of the towing vehicle, permitting small quantities of air to enter below the base plate so as to create an airfoil effect, thereby limiting excessive downward thrust upon the towing vehicle. In like fashion, air moving in a direction across the width of the vehicle tends, in part, to enter the space formed below the lowermost surface of the base plate and the roof of the towing vehicle, thereby providing a slight airfoil lifting effect by the remaining portions of the air which are forced to extend over a collapsible accordian pleat-like sheet affixed to the side marginal edges of the base plate and the air deflecting surface. Such air streams, engaging the adjustable side sheets that are caused to flow over the uppermost surface of the air deflecting surface, are directed up over the towed vehicle further creating an air shroud, of moving air, limiting the drag effect otherwise created by the forward faces of the towed vehicle. A pair of arms are affixed to the edges of the base plate and the air deflecting surface and utilize a slot, bolt, and wing nut arrangement to facilitate the placement of the air deflecting surface at selected angles relative to the roof of the towing vehicle.

Figure 1:
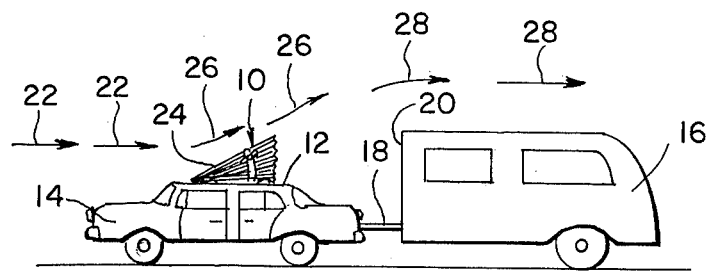
FIG. 1 is a side elevation view of the present invention removably affixed to the roof of a towing vehicle to which a towed vehicle is affixed.

Now referring to the Figures, and more particularly to the embodiment illustrated in FIG. 1 showing the present invention 10 being disposed mounted on the roof 12 of a towing vehicle 14. Towed vehicle 16, such as a trailer, is hitched to the rear of the towing vehicle utilizing bar 18 therefor. The leading front edges 20 of towed vehicle 16 tend to cause a drag effect when encountering an air stream in a direction of arrow 22. Air deflecting surface 24 causes air to be deflected in the directions of arrows 26 and causes the air stream to pass in the directions of arrows 28 over front edges 20, thereby minimizing the drag effects on towing vehicle 14.

Figure 2:
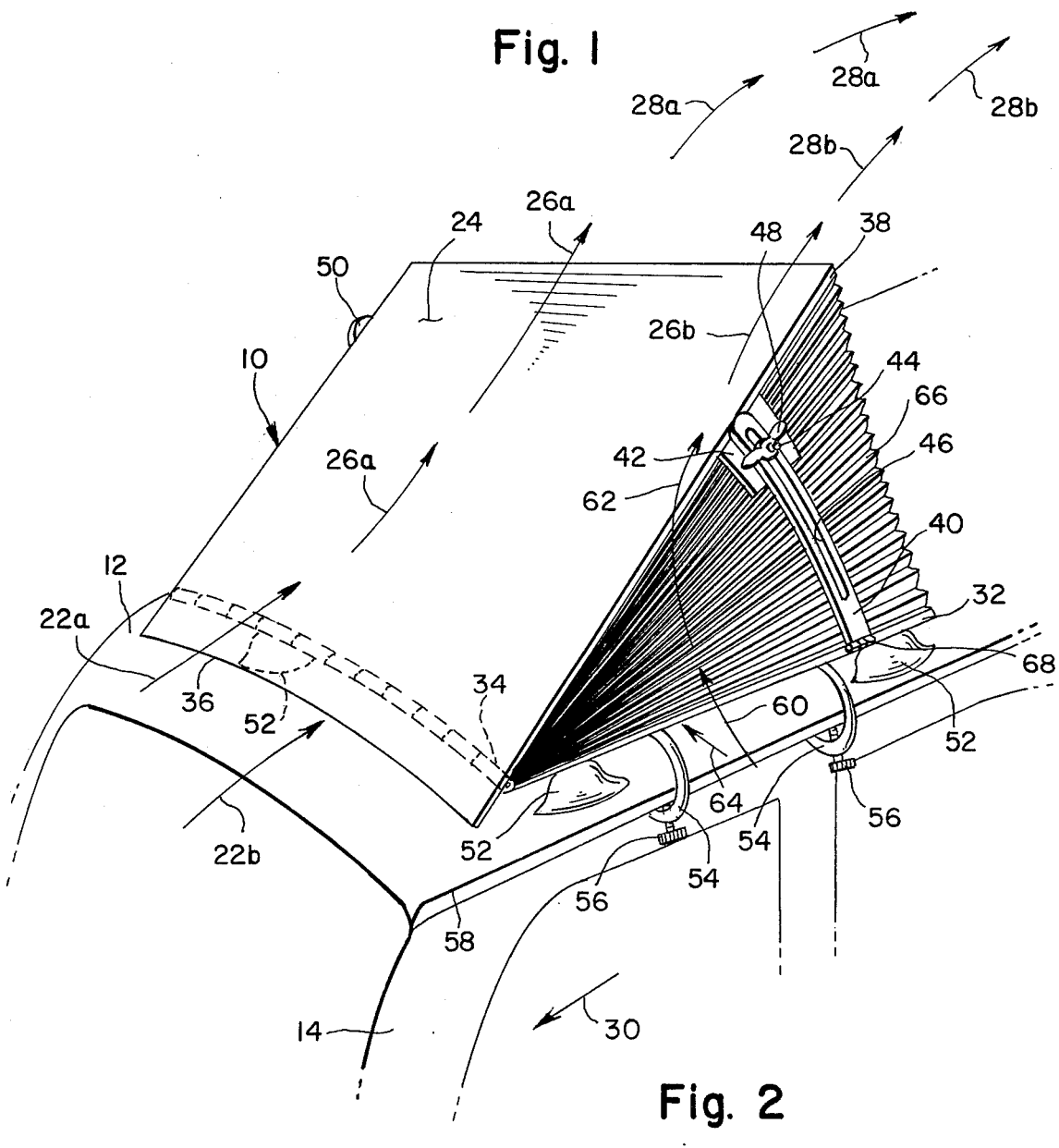
FIG. 2 is a perspective view of the present invention shown removably secured to the roof of the towing vehicle depicted in FIG. 1.

FIG. 2 illustrates the roof 12 of towing vehicle 14 which generally proceeds in the direction of arrow 30. Air deflecting surface 24 is fastened hingably to base plate 32 utilizing barrel hinge 34 therefor. The leading edge 36 of inclinable plate 38 is disposed above roof surface 12. Arm 40 is affixed to one end to the side marginal edge of base plate 32. Arm 42 is affixed to one end to the side marginal edge of inclinable plate 38 and is adapted with threaded screw 44 extending outwardly therefrom, passing through slot 46 in arm 40. Wing nut 48 clampingly engages arm 40 to arm 42 when tightened permitting locating inclinable plate 38 at a selected angle relative to roof 12. Arm 50 is secured to the opposed marginal edge of base plate 32 and is seen projecting slightly above air deflecting surface 24. An equivalent arm 42, bolt 44, and wing nut 48 is utilized on the opposite marginal edges of base plate 32 and inclinable plate 38 in the same fashion as arms 40 and 42.

Rubber-like suction cups 52 support solid base plate 32 above roof 12. Clamps 54 utilize bolts 56 to clamp base plate 32 against rain gutter 58 of towing vehicle 14.

Air, directed at air deflecting surface 24 in the direction of arrow 22a, is turned upwardly and rearwardly in the directions of arrows 26a and eventually extends rearwardly of towing vehicle 14 in the directions of arrows 28a. A far lesser percentage of air proceeding in the direction of arrow 22b, passes beneath leading edge 36 and is confined below base plate 32 and above roof 12, thereby creating an airfoil lifting effect upon the present invention 10. Air proceeding in the direction of arrow 60 is causes to turn upwardly and rearwardly in the direction of arrow 62, thence to proceed in the directions of arrows 26b and arrows 28b. Air proceeding in the direction of arrow 64 passes beneath base plate 32 and over roof 12 and in combination with air originally moving in the direction of arrow 60, causes an airfoil lifting effect on the present invention 10, due to the contact of moving air in the direction of arrow 60 with accordian pleated side 66 joining the side marginal edges of the adjacent sides of base plate 32 and inclinable plate 38. Another accordian pleated side, now shown, is fastened to the adjacent side edges on the other side of base plate 32 and inclinable plate 38. The pair of accordian pleated side surfaces typified by side 66, may be fabricated of a plurality of elongated rigid slats, each hingably fastened to adjacent slats by a flexible sheet such as a plastic jacket enclosing the slats. Thus, for angular displacement selected for inclinable plate 38, a solid though adjustable wall 66 is presented on each side edge of the present invention. The resultant apparatus is an effective air plow which diverts substantial portions of rearwardly directed air and sidewardly directed air impinging upon the apparatus as the towing vehicle proceeds in a straight line of travel and makes turns along the road bed. The upwardly and rearwardly deflected air, derived from the aforementioned air directions, are caused to flow over the leading vertical surfaces 20, as shown in FIG. 1, thereby minimizing the air dragging effect caused by the towed vehicle. Arm 40 is shown hingably secured to base plate 32, utilizing barrel hinge 68 therefor, allowing the apparatus to be folded up in a near flat condition when not in use, by allowing arm 42 to fold underneath base plate 32 when bolt 44 is disengaged from slot 46.

One of the advantages is an inclined air deflecting surface which presents side walls to cross currents of moving air regardless of the angle of inclination of the apparatus relative to the plane of the roof of the towing vehicle to which it is affixed.

Another advantage is an air deflecting surface whose angle of inclination may be varied relative to the plane of the roof of the towing vehicle to which it is affixed.

Still another advantage is an air deflecting surface which permits a portion of wind gusts directed at the side of the towing vehicle to pass under the deflecting apparatus thereby minimizing the forces induced on the deflecting apparatus by such cross currents of air.

Yet another advantage is an air deflecting apparatus which deflects streams of air impinging upon the towing vehicle from angles directed towards the rear of the towing vehicle as well as from angles directed towards the side of the towing vehicle.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. An air current deflecting device for a towing vehicle pulling a towed vehicle comprising an elongated deflecting plate spaced above the roof of the towing vehicle, the deflecting plate having a face portion with leading and trailing edges, the trailing edge normally being positioned above and rearwardly of the leading edge so that the face portion deflects a portion of the air passing over the roof of the towing vehicle, an elongated base plate hingably secured to the deflecting plate along a line extending across the width of the towing vehicle, the line being disposed intermediate the leading edge and the trailing edge, means to detachably secure the base plate in spaced apart relationship above the roof of the towing vehicle, means to secure the deflecting plate at selected angles of inclination relative to the plane of the roof of the towing vehicle above the base plate, a pair of symmetrical pleated accordian-like side walls extended between and limited to the opening formed between adjacent marginal side edges of the base plate and the deflecting plate, said side wall having a plurality of pleats, said plurality of pleats extending angularly relative to one another intersecting at an apex located at said line, whereby said plurality of pleats accommodate disposing said deflecting plate at said selected angles.

2. The air current deflecting device as claimed in claim 1 wherein said means to detachably secure comrises a plurality of rubber-like suction cups fixedly secured to the base plate, the open mouth portions of the suction cups being disposed in touching engagement with the roof of the towing vehicle.

3. The air current deflecting device as claimed in claim 2 further comprising a plurality of clamping members being disposed fixedly secured to the side marginal edges of the base plate, each of the clamping members having a bolt compressively engaging the rain gutter portions of the towing vehicle.

4. The air current deflecting device as claimed in claim 1 wherein the deflecting plate securing means comprises a first arm, a slot extending along a portion of the length of the first arm, one end of the first arm secured to one side marginal edge of the base plate, a second arm, one end of the second arm fixedly secured to the side marginal edge of the deflecting plate adjacent said one side marginal edge, a threaded rod extending outwardly from the second arm and passing through the slot, a wing nut threadingly engaging the threaded rod and disposed clamping the first arm to the second arm when the wing nut is tightened manually.

5. The air current deflecting device as claimed in claim 1 wherein the leading edge of the deflecting plate is disposed intermediate the roof of the towing vehicle and the base plate.

6. The air current deflecting device as claimed in claim 1 further comprising a barrel hinge hingably affixing a marginal edge of the base plate intermediate the side marginal edges thereof to the deflecting plate along said line.

7. The air current deflecting device as claimed in claim 4 further comprising a hinge hingably securing said one end of the first arm to said one side marginal edge of the base plate, the hinge being disposed permitting the first arm to be folded parallel to a surface of the base plate.

* * * * *